United States Patent
Beyer et al.

(10) Patent No.: US 9,893,570 B2
(45) Date of Patent: Feb. 13, 2018

(54) SYSTEM FOR CONTACTLESS ENERGY AND DATA TRANSFER

(71) Applicant: Balluff GmbH, Neuhausen a.d.F. (DE)

(72) Inventors: Matthias Beyer, Stuttgart (DE); Stephan Senn, Wernau (DE); Fabian Kayser, Stuttgart (DE)

(73) Assignee: Balluff GmbH, Neuhausen a.d.F. (DE)

(*) Notice: Subject to any disclaimer, the term of this patent is extended or adjusted under 35 U.S.C. 154(b) by 198 days.

(21) Appl. No.: 15/008,553

(22) Filed: Jan. 28, 2016

(65) Prior Publication Data
US 2016/0226317 A1 Aug. 4, 2016

(30) Foreign Application Priority Data
Jan. 29, 2015 (DE) .................. 10 2015 101 351

(51) Int. Cl.
*H02J 50/80* (2016.01)
*H04L 25/49* (2006.01)
*H02J 50/10* (2016.01)

(52) U.S. Cl.
CPC .............. *H02J 50/80* (2016.02); *H02J 50/10* (2016.02); *H04L 25/4902* (2013.01)

(58) Field of Classification Search
CPC ........ H02J 50/80; H02J 50/10; H04L 25/4902
See application file for complete search history.

(56) References Cited

U.S. PATENT DOCUMENTS

| 5,649,295 A | 7/1997 | Shober et al. |
| 6,107,910 A | 8/2000 | Nysen |
| 2004/0104799 A1 | 6/2004 | Haisch |
| 2012/0126832 A1 | 5/2012 | Jensen et al. |
| 2013/0012037 A1 | 1/2013 | Enomoto et al. |

(Continued)

FOREIGN PATENT DOCUMENTS

| CN | 1495983 A | 5/2004 |
| CN | 102834891 A | 12/2012 |
| DE | 197 38 299 A1 | 3/1999 |

(Continued)

OTHER PUBLICATIONS

First Office Action dated Nov. 3, 2017 in Chinese Patent Application No. 201610065396.7.

(Continued)

*Primary Examiner* — Robert Deberadinis
(74) *Attorney, Agent, or Firm* — Collard & Rose, P.C.

(57) ABSTRACT

A system for contactless energy and data transfer has mobile and base parts. The mobile part contains a mobile part transmitter/receiver device transmitting and receiving a data signal, a mobile part transceiver and a current supply having a mobile part resonant circuit receiving an energy signal. The base part contains a base part resonant circuit for emitting the energy signal from an energy signal generator to provide a supply voltage to the current supply, a base part transmitter/receiver device receiving and transmitting the data signal, a base part transceiver, and a pulse width modulator. An impulse width modulator provides the pulse width-modulated signal which cyclically operates the energy signal generator to emit the energy signal in pulse bundles. A parameter specification provides a control signal setting at least one parameter of the pulse width-modulated signal to a value where sufficient energy transfer occurs to provide the supply voltage.

11 Claims, 4 Drawing Sheets

(56) References Cited

U.S. PATENT DOCUMENTS

2015/0022011 A1    1/2015   Kim et al.

FOREIGN PATENT DOCUMENTS

| DE | 199 23 376 A1 | 6/2000 |
| DE | 101 40 930 C1 | 6/2003 |
| DE | 10 2010 008 495 A1 | 8/2011 |
| DE | 10 2011 114 612 A1 | 5/2013 |
| JP | 2006324525 A | 11/2006 |
| WO | 2015/070831 A1 | 5/2015 |

OTHER PUBLICATIONS

Search Report dated Oct. 24, 2017 in Chinese Patent Application No. 201610065396.7.

SYSTEM FOR CONTACTLESS ENERGY AND DATA TRANSFER

CROSS REFERENCE TO RELATED APPLICATIONS

Applicant claims priority under 35 U.S.C. § 119 of German Application No. 10 2015 101 351.7 filed Jan. 29, 2015, the disclosure of which is incorporated by reference.

BACKGROUND OF THE INVENTION

Field of the Invention

The invention relates to a system for contactless energy and data transfer according to the independent claim.

State of the Art

The applicant offers measurement devices for object detection, for example at the internet link leading to the applicant: http://www.Balluff.com, which are based on different physical principles such as, for example, inductive distance sensors, micropulse displacement transducers, magneto-inductive displacement sensors, magnetically coded displacement and angle measurement systems and, for example, opto-electronic distance sensors. The Measurement devices ultimately determine the position of a moving object with regard to a position sensor or the distance of a moving object from the position sensor.

In patent application DE 10 2010 008 495 A1, an approach for position measurement of an object is described in which a magnet allocated to the object is moved along a magnetostrictive waveguide, wherein the magnet induces a first magnetic field component in a region in the waveguide, in which furthermore a current signal is provided with a current pulse which induces a current magnetic field in the waveguide which has at least one field component in the waveguide which deviates from the field component induced by the magnet such that, in the determined region of the magnetostrictive waveguide, a wave results due to the field change during the current pulse as a consequence of the magnetostrictive effect. The wave is detected in an evaluation unit, wherein the position of the object is determined from the travel time of the wave in the waveguide. The known approach is distinguished in that the current signal begins with a targeted, predetermined current ramp-up, the temporal course of which is determined in such a way that no wave is detected and that such a current pulse is provided in connection with the current ramp-up which leads to the emergence of a detectable wave.

In patent specification DE 101 40 930 C1, a tactile sensor system is described with which an obstruction protection is implemented on bus doors. A transponder implemented as an RFID (Radio-Frequency Identification) is provided in the door, said transponder constantly transferring a sensor signal to an evaluation unit arranged in the door frame. The energy supply of the transponder arranged in the bus door is gained from an energy signal which is constantly emitted from the evaluation unit. In the case of an obstruction procedure, a safety edge arranged in the door seal is operated which is contacted with two damping coils. The two damping coils influence the emission of the sensor signal depending on the switch status of the safety edge. In the case of a closed contact of the safety edge, the sensor signal is dampened strongly or is completely suppressed. The field strength decrease or the complete elimination of the emitted sensor signal is classified as an obstruction procedure by a receiving unit in the evaluation unit.

In patent application DE 10 2011 114 612 A1, a method to process Kanban tasks and an RFID pallet box are known. To process order procedures in the scope of task processing in the supply of small parts between a supplier and a client, containers filled with small parts are supplied by the supplier to an extraction point and containers emptied by the client are given back again. The containers are equipped with RFID transponders which are able to be read in a reading procedure and which contain data concerning the containers. Several containers are arranged in a box. The reading procedure after the adjustment of an empty container in the box is triggered by a door or a cover of the box being closed.

The not previously published international application PCT/DE2013/000676 A1 describes a position measurement device having a position sensor which contains a position sensor transmitter/receiver antenna, a transmission unit, a current supply as well as a switch element. The position measurement device furthermore comprises an evaluation unit which contains an evaluation unit transmitter/receiver antenna, via which the evaluation unit emits an energy signal from which the current supply of the position sensor gains energy for the transmission unit. The evaluation unit furthermore contains a receiving unit which provides an output signal. An operating element is provided which is allocated to a moving object and which operates the switch element of the position sensor for a predetermined position of the object or from a predetermined distance of the object from the position sensor. In the case of a closed switch element, the position sensor emits a data signal via the position sensor transmitter/receiver antenna which the evaluation unit transmitter/receiver antenna receives and which provides the receiving unit with the initial signal as a measure for the position of the object. The known position measurement device provides a wireless position sensor such that an expensive cabling of the position sensor which was required previously is omitted. As a result of the position sensor of the known position measurement device only emitting the position signal in the case of a closed switch element and additionally not transmitting it in this case, the evaluation unit receives a clear signal which can be allocated correspondingly clearly to a certain position of the moving object with regard to the position sensor or a distance of the moving object from the position sensor.

Patent application U.S. 2012/126832 A1 describes a proximity sensor which contains a position sensor which transmits positional information wirelessly to an evaluation unit. The position sensor contains a microwave transmitter which emits a microwave signal which is influenced by an object located in proximity thereto. An approaching object detunes the microwave transmitter by a change of the load thereof. Transmitter/receiver antennae are not present either in the position sensor or in the evaluation unit. A wireless transfer of the energy required for the position sensor from an evaluation unit to the position sensor is not provided.

Document DE 199 23 376 A1 describes a device for wireless position detection of an object. The position sensor contains both a transmitter antenna and a receiver antenna. The transmitter antenna emits a high-frequency signal which is received by the receiver antenna, wherein the coupling is influenced by the object. The coupling between the position sensor and an evaluation unit occurs using wires.

Document DE 197 38 299 A1 describes a sensor which works wirelessly and which is used in a tool holder. A surface wave sensor is provided as a sensor, which provides a measurement signal which can be requested via a wireless connection. The energy supply of the surface wave sensor likewise occurs via the wireless connection. A switch element can be provided which activates a reflector mark which influences the signal of the surface wave sensor or which switches a transmitter/receiver antenna of the surface wave sensor on or off.

Patent application U.S. Pat. No. 5,649,295 A describes a wireless communication system in which a stationary unit communicates wirelessly with mobile units. Besides the wireless data transfer, the energy supply of the mobile units also occurs via a high-frequency connection. The communication system corresponds to an RFID system. Such an RFID system is described in detail in patent specification U.S. Pat. No. 6,107,910 A.

In the case of sensor systems which work wirelessly and in which the energy required for a mobile part is gained from an energy signal which is emitted from a base part, it must, on the one hand, be ensured that sufficient energy to operate the mobile part can be provided in the predetermined transfer region between the base part and the mobile part and that, on the other hand, specifications relating to the emission of high-frequency signals are complied with.

The object of the invention is to specify a system which works in a contactless manner for contactless energy and data transfer with an optimum wireless energy transfer from a base part to a mobile part.

The object is solved by the features specified in the independent claim.

DISCLOSURE OF THE INVENTION

The system according to the invention for contactless energy and data transfer comprises a mobile part which contains a mobile part transmitter/receiver device to transmit and receive a data signal, a mobile part transceiver and a current supply with a mobile part resonant circuit to receive an energy signal. The sensor system furthermore comprises a base part which contains a base part resonant circuit via which the base part emits an energy signal provided by an energy signal generator, from which energy signal the current supply of the mobile part gains a supply voltage. The base part furthermore contains a base part transmitter/receiver device to transmit and receive the data signal and a base part transceiver.

The system according to the invention for contactless energy and data transfer is distinguished in that the base part contains a pulse width modulator, that the provision of a pulse width-modulated signal is provided by the pulse width modulator, that a cyclic operation of the energy signal generator is provided with the pulse width-modulated signal such that a emission of the energy signal is provided in pulse bundles, and that a parameter specification is provided which provides a control signal which sets at least one parameter of the pulse width-modulated signal, wherein the at least one parameter is set to a value at which sufficient energy is transferred to the mobile part, said energy ensuring a provision of the supply voltage in the mobile part.

The mobile part of the system according to the invention for contactless energy and data transfer is prepared for connection to a sensor. Preferably a position sensor is provided as a sensor. The mobile part having a connected sensor is in particular suitable for arrangement on moving objects. The elimination of disruptive cable connections is made noticeable in a particularly advantageous manner. Due to the energy transfer, the use of a battery in the mobile part is also omitted, said mobile part also supplying the sensor with electrical energy if required.

The system according to the invention for contactless energy and data transfer has a low energy requirement. In particular, only the minimum required energy is emitted from the base part which is still sufficient to gain the supply voltage required for the mobile part from the emitted energy signal.

The control signal or the parameter of the pulse width-modulated signal is set in such a way that the predetermined maximum distance between the mobile part and the base part is achieved, within which the base part is still to recognize the presence of a mobile part due to the data signal emitted from the mobile part in the case of present supply voltage.

A radiation exposure of persons which is as low as possible is achieved using the system according to the invention for contactless energy and data transfer. Furthermore, an unnecessary and potentially damaging heating of workpieces and/or components, which are exposed to the emitted energy signal and convert the absorbed energy into heat, is prevented The at least one parameter of the pulse width-modulated signal, which is set in a targeted manner to emit the minimum possible energy of the energy signal, is preferably adjusted to a determined value in the scope of a calibration of the system for contactless energy and data transfer, said value—as already mentioned—still being sufficient for the mobile part to gain a sufficient supply voltage from the emitted energy signal.

Advantageous developments of the system according to the invention for contactless energy and data transfer are each subject matter of the dependent claims.

According to one embodiment, a specification of the value of the parameter of the pulse width-modulated signal to a value which is predetermined in a fixed manner is provided. The value which is predetermined in a fixed manner is preferably determined in an experimental manner and adjusted in a fixed manner.

According to a development, an automatic specification of the at least one parameter of the pulse width-modulated signal is provided. For this purpose, it is provided that the base part determines a detection signal for a received data signal and provides the parameter specification. The parameter specification sets the at least one parameter of the pulse width-modulated signal depending on an occurrence of the detection signal in such a way that the energy of the emitted energy signal is minimized, wherein the detection signal still occurs. The occurrence of the detection signal requires the presence of the supply voltage of the mobile part.

Embodiments relate to the selection of the at least one parameter of the pulse width-modulated signal.

According to a first embodiment, the ratio of pulse duration to pulse break is provided as a parameter of the pulse width-modulated signal. The ratio of pulse duration to pulse break is set to a minimum value at which a sufficient supply voltage occurs in the position sensor.

According to a second embodiment, the pulse duration is additionally or alternatively provided as a parameter of the pulse width-modulated signal. In this case, the pulse duration is variable and the pulse break is determined in a fixed manner. The pulse duration is set to a minimum value at which a sufficient supply voltage occurs in the position sensor.

According to a third embodiment, the pulse break is alternatively or additionally provided as a parameter of the pulse width-modulated signal. In this case, the pulse break is variable and the pulse duration is determined in a fixed manner. The pulse break is set to a maximum value at which a sufficient supply voltage occurs in the position sensor.

According to a further embodiment, the duty cycle is alternatively provided as a parameter of the pulse width-modulated signal. In this case, the duty cycle, which corresponds to the ratio of the pulse duration to the total of the pulse duration and the pulse break, is set to a minimum value at which a sufficient supply voltage occurs in the position sensor.

According to another embodiment, the period duration of the pulse width-modulate signal is alternatively provided as a parameter of the pulse width-modulated signal. In this case, the period duration is set to a maximum value at which a sufficient supply voltage occurs in the position sensor.

Another advantageous embodiment of the system according to the invention for contactless energy and data transfer provides a buffer capacitor in the current supply of the mobile part in addition to the implementation of the mobile part resonant circuit as an LC resonant circuit. A circuit is implemented with these simple and cheap components, said circuit ensuring efficient production of the supply voltage of the mobile part from the emitted energy signal.

Further advantageous developments and embodiments of the system according to the invention for contactless energy and data transfer result from the following description.

Exemplary embodiments of the invention are depicted in the drawings and are explained in more detail in the following description.

DETAILED DESCRIPTION OF THE EXEMPLARY EMBODIMENTS

Figure 1:
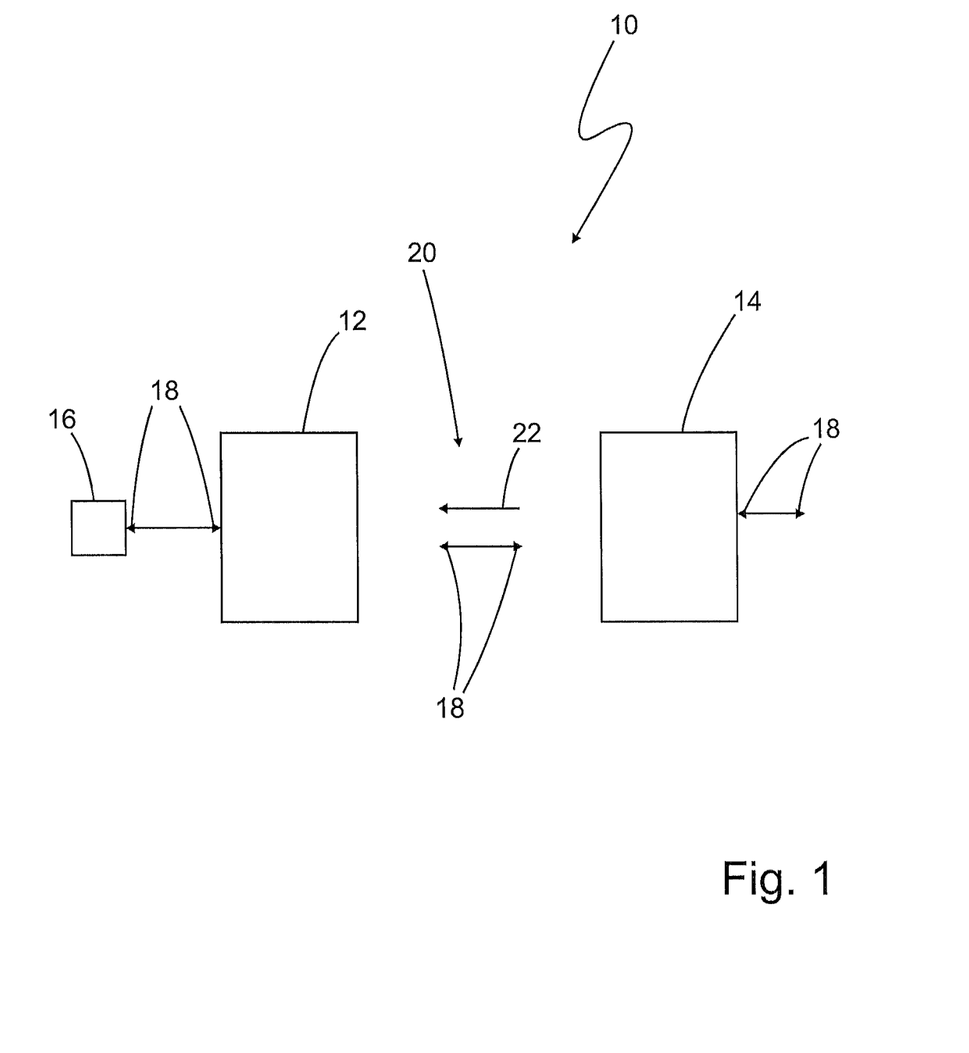
FIG. 1 shows, schematically, a system according to the invention for contactless energy and data transfer.

FIG. 1 shows a system according to the invention for contactless energy and data transfer 10, which comprises a mobile part 12 and a base part 14.

The mobile part 12 is prepared for connection of a sensor 16, for example a position sensor which detects a position of an object which is not shown in more detail and/or the distance between the object and the position sensor and transmits this to the base part 14 as a data signal 18. The data signal 18 can be a bidirectional data signal 18 which contains, on the one hand, the data detected by the sensor 16 and, on the other hand, data for the sensor 16 such as, for example, calibration data or resolution switching signal.

Contactless connections 20 are located between the mobile part 12 and the base part 14. A first bidirectional contactless connection is provided to transfer the data signal 18. A second unidirectional contactless connection is provided to transfer the energy signal 22.

Figure 2:
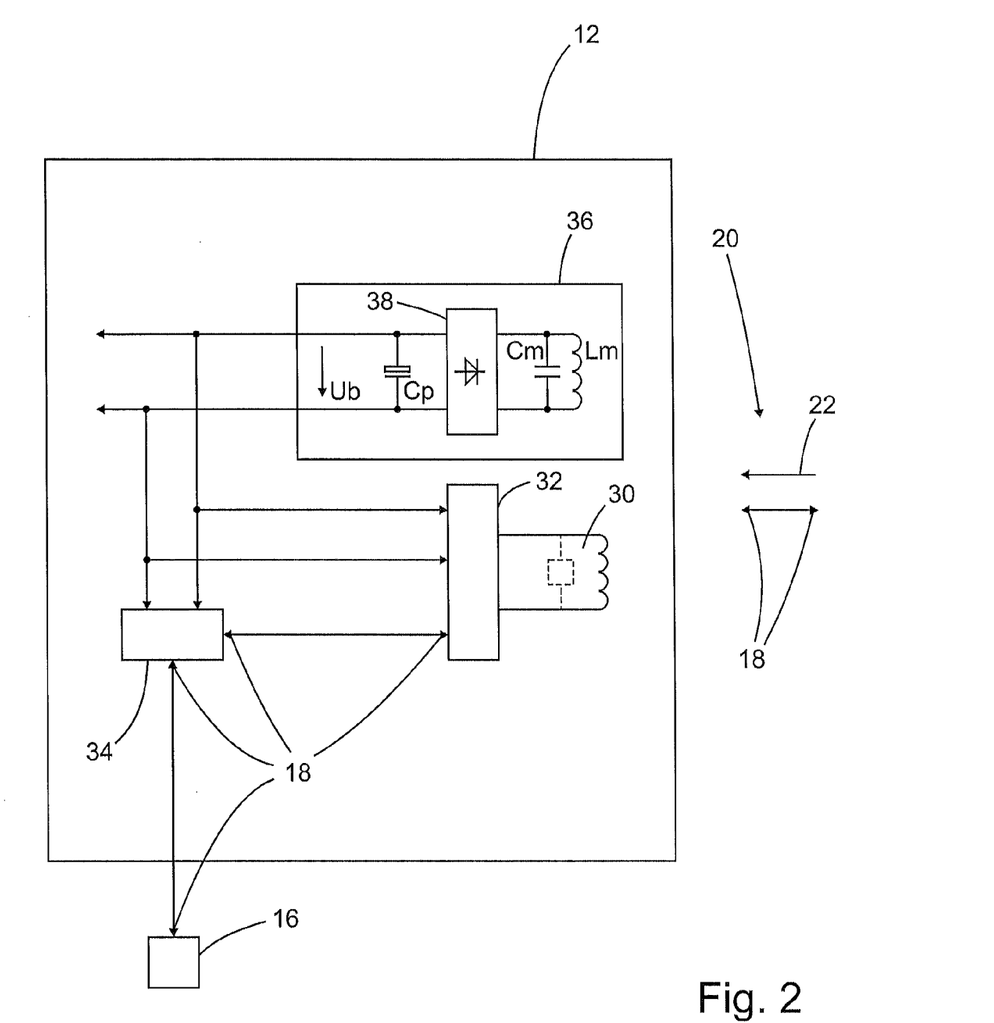
FIG. 2 shows a mobile part which is part of the system according to the invention for contactless energy and data transfer.

FIG. 2 shows a block diagram of the mobile part 12. Those parts which correspond with the parts shown in FIG. 1 are each referred to with the same reference numerals in FIG. 2. The same applies for the following figures.

The mobile part 12 contains a mobile part transmitter/receiver device 30 which, for example, is implemented as a coil or as an opto-electronic transmitter/receiver device. The mobile transmitter/receiver device 30 receives the data signal 18 potentially emitted by the base part 14 and emits the data signal 18 itself.

The mobile part transmitter/receiver device 30 is connected to a mobile part transceiver 32. The mobile part transceiver 32 transmits the potentially received data signal 18 to a mobile part microcontroller 34 which emits the data signal 18 to the sensor 16. The mobile part microcontroller 34 includes a data interface, via which the incoming and outgoing data is guided.

The mobile part 12 furthermore contains a current supply 36 which has a mobile part resonant circuit Cm, Lm, a rectifier 38 and a buffer capacitor Cp. The coil Lm of the mobile part resonant circuit Cm, Lm is the receiving coil for the energy signal 22. The mobile part resonant circuit Cm, Lm gains an AC voltage from the energy signal 22 which the rectifier 38 rectifies and provides as a supply voltage Ub. The supply voltage Ub is provided to the mobile part receiver 32, to the mobile microcontroller 34 and to further components such as, for example, the sensor 16.

The mobile part resonant circuit Lm, Cm is preferably coordinated as accurately as possible to the frequency of the emitted energy signal 24 such that resonance occurs at least approximately and therefore an energy gain which is as high as possible is achieved. The energy signal 22 is extensively formed by the magnetic field components H of the radio connection.

The current supply 36 as well as the mobile part transceiver 32 can, together with the mobile part transmitter/receiver device 30, be referred to as a transponder.

The capacity of the buffer capacitor Cp is measured in such a way that, on the one hand, a sufficient smoothing of the supply voltage Ub is achieved and that, on the other hand, a sufficient charge quantity can be stored for the case where the mobile part resonant circuit Lm, Cm cannot supply energy in the case of a short-term weaker energy signal 22, wherein, however, the supply voltage Ub is still to be maintained for the proper function of the mobile part 12. In practice, the described supply voltage Ub is not used directly for energy supply of the mobile part 12, but only after a stabilisation to a predetermined voltage value which is not shown in more detail.

The data signal 18 to be transmitted by the mobile part 12 can comprise, in the case of a sensor 16 implemented as a position sensor, the determined position data and identifiers such as, for example, a number of sensors 16.

Figure 3:
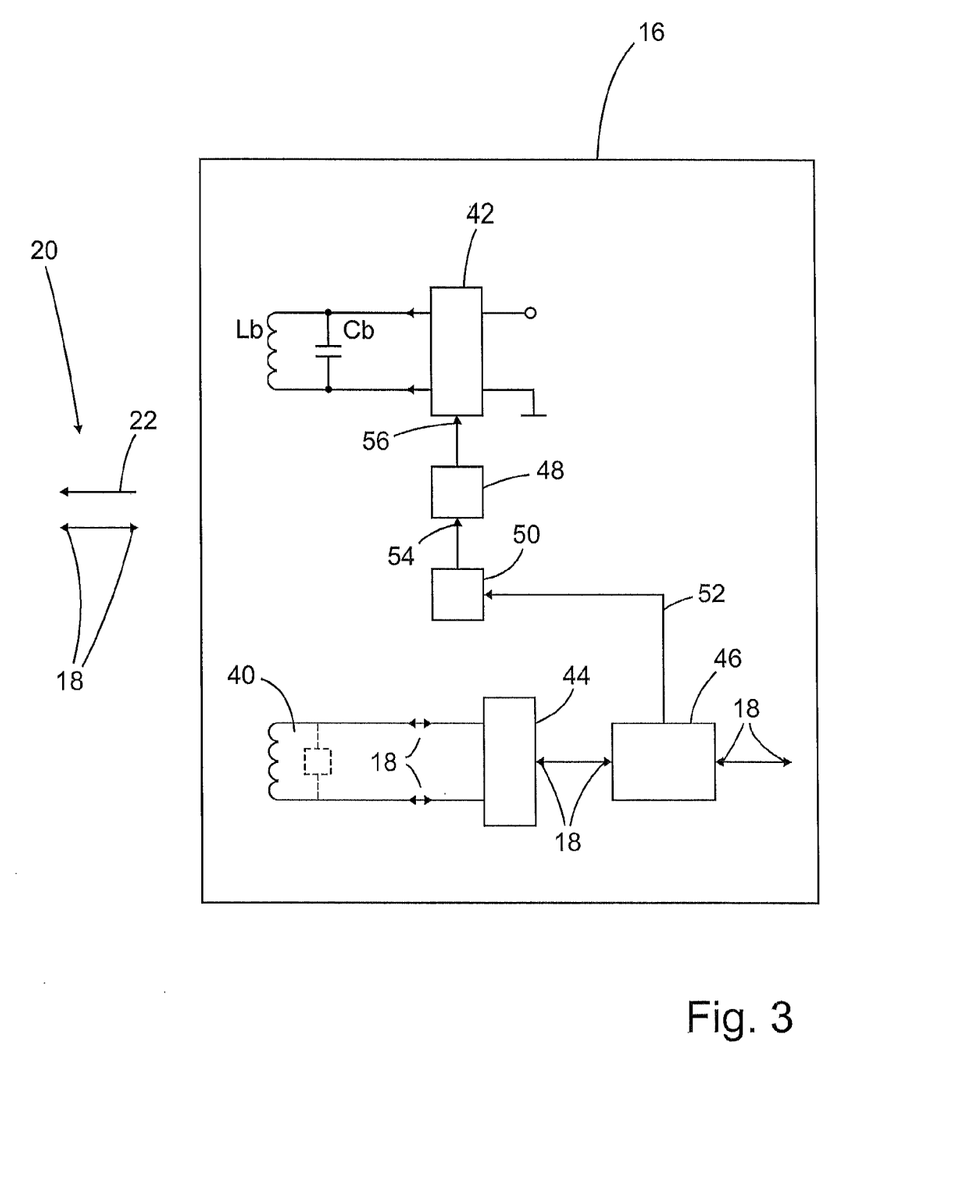
FIG. 3 shows a base part which is part of the system according to the invention for contactless energy and data transfer.

FIG. 3 shows a block diagram of the base part 14. The base part 14 contains a base part transmitter/receiver device 40 which is implemented as a coil or as an opto-electronic transmitter/receiver device, an energy signal generator 42, a base part resonant circuit Lb, Cb which is connected to the energy signal generator 42, a base transceiver 44, a base part microcontroller 46, a pulse width-modulator 48 as well as a parameter specification 50.

The energy signal generator 42 provides the energy signal 22 to be transmitted which the coil Lb of the base part resonant circuit Lb, Cb emits, for example as a magnetic field component H or alternatively as an electrical component E. Therefore, the system 10 according to the invention works at close range. A radio transfer which corresponds to a resolution of an electromagnetic wave is not required because of the comparably low distance to be bridged.

The base part microcontroller 46 obtains the data signal 18 received by the base part transmitter/receiver device 40 and provides the data signal with 18 further components which are not shown in more detail.

The base part microcontroller 46 potentially determines a detection signal 52, which is provided to the parameter specification 50, from the received data signal 18.

The parameter specification 50 controls the pulse width modulator 48 with a control signal 54 whilst the pulse width modulator 48 impinges the energy signal generator 42 with a pulse width-modulated signal 56. The parameter specification 50 is preferably contained in the microcontroller 46.

Figure 4:
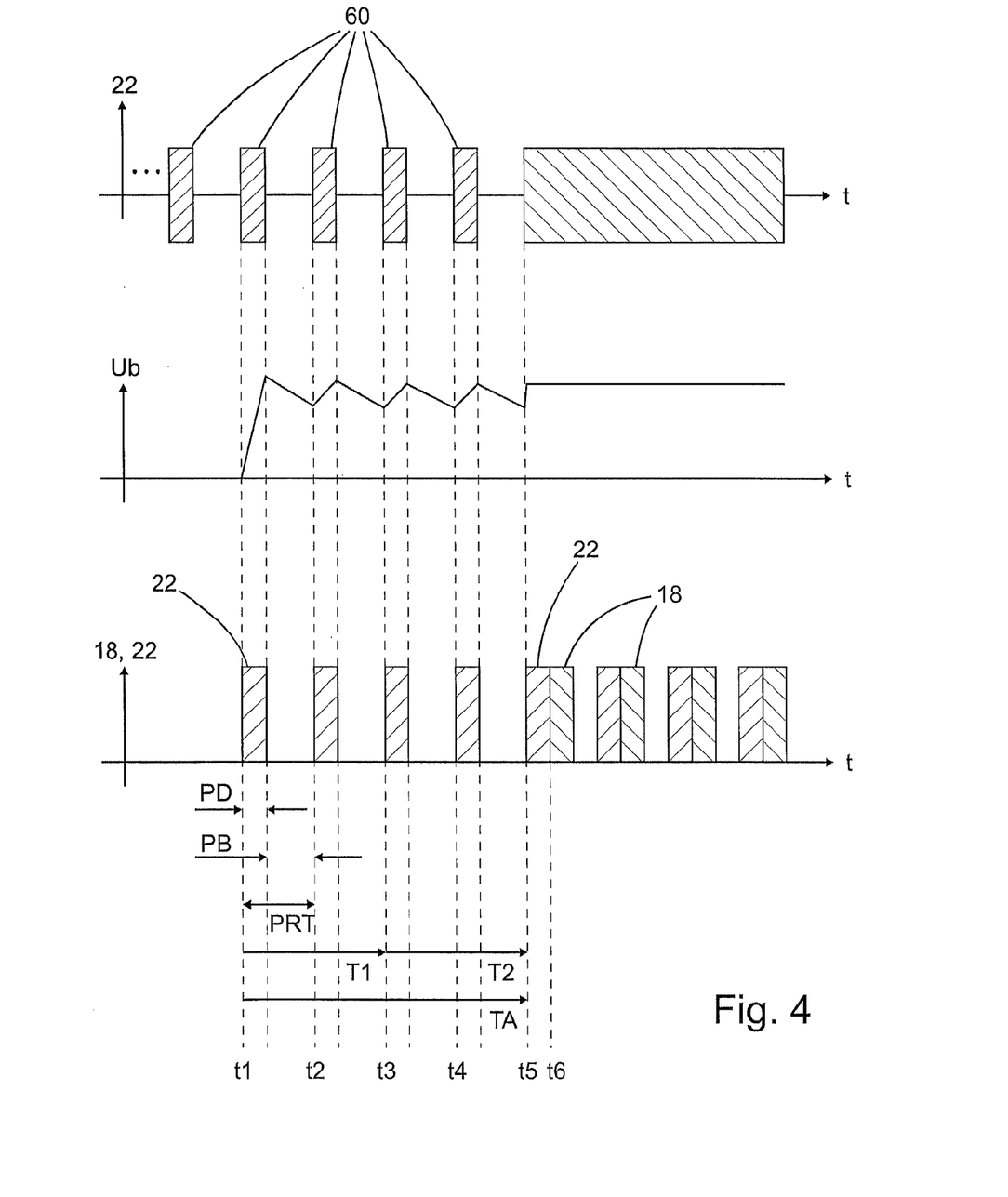
FIG. 4 shows signal courses as a function of time which occur in the system according to the invention for contactless energy and data transfer.

The functionality of the system according to the invention for contactless energy and data transfer 10 is explained in more detail by means of the signal courses shown in FIG. 4 as a function of time t and the specifications reflected in FIG. 4;

The starting point is a resting state in which no supply voltage Ub is provided to the mobile part 12, during which, however, the base part 14 emits the energy signal 22. The start-up of the mobile part 12 begins at a first point in time t1 at which a start-up time TA begins. The mobile part 12 lies in the receiving region of the energy signal 22 from the first point in time t1, such that the current supply 36 begins to gain the operating voltage Ub.

According to prior art, the energy signal 22 was continuously emitted with a certain power, for example 100 W. Due to the continuously emitted energy signal 22, a high energy requirement occurred in the base part 14. In particular, however, the emission of the energy signal 22 occurs with unnecessarily high energy. The high amount of energy emitted leads to a correspondingly high radiation exposure of persons who stop in the region of the sensor system 10. In particular, the high amount of energy can lead to a potentially inadmissible heating of workpieces or other components which are located in the region of the system for contactless energy and data transfer 10. The high energy exposure already occurs during the start-up time TA of the system 10. The start-up time TA is composed of a reset time T1 and a start time T2. In the case of present supply voltage Ub, during the reset time T1 in particular, the mobile part microcontroller 32 is transferred to a basic state with a reset signal which is not shown in more detail. At the latest at the beginning of the start time T2, further components are started up.

According to the invention it is provided that, at least during the start-up time TA, an emission of the energy signal 22, which is shown in the upper signal course of FIG. 4, is provided not as a continuous signal, but as a pulse bundle 60 corresponding to the pulse width-modulated signal 56. For this purpose, the pulse width modulator 48 controls the energy signal generator 42 in a cyclical manner by means of the pulse width-modulated signal 56. In the upper signal course of FIG. 4, four impulse bundles 60 are shown by way of example which each begin at the points in time t1, t2, t3, t4.

The pulse bundles have a pulse duration PD, followed by a pulse break PB. The period duration PRT corresponds to the total of the pulse duration PD and pulse break PB. Both the pulse duration PD and the pulse break PB are parameters of the pulse width-modulated signal 56. Furthermore, the ratio V of pulse duration PD to pulse break PB is a parameter of the pulse width-modulated signal 56. A parameter corresponding to the ratio V of the pulse width-modulated signal 56 is the duty cycle TV which corresponds to the ratio of the pulse duration PD to the total of the pulse duration PD and pulse break PB. The already referred to total of the pulse duration PD and the pulse break PB, which corresponds to the period duration PRT of the pulse width-modulated signal 56, likewise reflects a parameter of the pulse width-modulated signal 56. The ratio V and the duty cycle TV are derived parameters which depend on the pulse duration PD and the pulse break PB or on the pulse duration PD and the total of the pulse duration PD and the pulse break PB.

In the average signal course of FIG. 4, the temporal course of the supply voltage Ub is shown at the buffer capacitor Cp. During the pulse duration PD, the supply voltage Ub increases due to the charging of the buffer capacitor Cp, whilst the supply voltage Ub falls again during the pulse breaks PB.

The supply voltage Ub is stabilized to a predetermined value with a stabilisation circuit which is not shown in more detail.

The influencing of the energy transferred to the mobile part 12 is provided by specification of at least one parameter PD, PB, V, TV, PRT of the pulse width-modulated signal 56. The at least one parameter PD, PB, V, TV, PRT of the pulse width-modulated signal 56 is determined by means of the control signal 54 of the parameter specification 50. The specification of the control signal 54 occurs in such a way that a sufficiently high amount of energy occurs in the mobile part 12 during the start-up time TA to gain the supply voltage Ub within the predetermined transfer region between the base part 14 and the mobile part 12. The parameter specification 50 can have adjustment elements for this purpose which are not shown in more detail for the at least one parameter PD, PB, V, TV, PRT of the pulse width-modulated signal 56, wherein the adjustment elements are adjusted in the scope of a calibration until the minimum possible energy is achieved in the temporal average value of the emitted energy signal 22 for the designed maximum range.

If the ratio V of pulse duration PD to pulse break PB is provided as a parameter of the pulse width-modulated signal 56, a change of the control signal 54 is provided until a minimum pulse duration PD is achieved.

If the pulse duration PD is provided as a parameter of the pulse width-modulated signal 56, wherein the pulse duration PD is predetermined in a variable manner and the pulse break PB is predetermined in a fixed manner, a change of the control signal 54 is provided until a minimum pulse duration PD is also achieved.

If the pulse break PB is provided as a parameter of the pulse width-modulated signal 56, wherein the pulse break PB is predetermined in a variable manner and the pulse duration PD is predetermined in a fixed manner, a change of the pulse break PB is provided until a maximum pulse break PB is achieved.

If the duty cycle TV is provided as a parameter of the pulse width-modulated signal 56, a change of the duty cycle TV is provided until a minimum duty cycle TV is achieved.

If the period duration of the pulse width-modulated signal 56 is provided as a parameter of the pulse width-modulated signal 56, the period duration PRT is set to a maximum value at which a sufficient energy occurs in the mobile part 12.

If necessary, more than one parameter PD, PB, V, TV, PRT of the pulse width-modulated signal 56 can be varied.

According to one development, an automatic determination of the at least one parameter PD, PB, V, TV, PRT of the pulse width-modulated signal 56 is provided. For this purpose, the parameter specification 50 changes the control signal 54 depending on the potentially provided detection signal 52. The detection signal 52 occurs if the mobile part 12 emits the data signal 18. In the shown exemplary embodiment, it is assumed that the data signal 18 occurs at the sixth point in time t6. If the data signal 18 is received by the base part transceiver 44 and the base part transceiver 44 can provide the detection signal 52 accordingly, a sufficient amount of energy must be achieved to provide the supply voltage Ub in the mobile part 12. This means that the parameter specification changes the control signal 54 in such a way that the at least one parameter PD, PB, V, TV, PRT of the pulse width-modulated signal 56 leads to an increase of the energy of the emitted energy signal 22 in the case of a present detection signal 52 and to a reduction of the energy of the emitted energy signal 22, averaged over time, in the case of present detection signal 52.

After the conclusion of the start-up time TA of the mobile part 12, normal operation begins, within which a transfer of measurement values is provided as a data signal 18 from the mobile part 12 to the base part 14. Purely in principle, the energy signal 22 could also be emitted during normal operation occurring after the point in time t5 as a pulse bundle 60. Normally, a continuous emission of the energy signal 22 is provided there.

In an implemented exemplary embodiment, the pulse duration PD amounts to 10 ms, the pulse break to 100 ms, the reset time T1 to 250 ms and the start time to 50 ms.

What is claimed is:

1. System for contactless energy and data transfer, having a mobile part (12) which contains a mobile part transmitter/receiver device (30) to transmit and receive a data signal (18), a mobile part transceiver (32) and having a current supply (36) which contains a mobile part resonant circuit (Lm, Cm) to receive an energy signal (22), having a base part (14) which contains a base part resonant circuit (Lb, Cb), via which the base part (14) emits the energy signal (22) provided by an energy signal generator (42), from which energy signal (22) the current supply (36) of the mobile part (12) obtains a supply voltage (Ub), wherein the base part (14) furthermore contains a base part transmitter/receiver device (40) to receive and transmit the data signal (18) and a base part transceiver (44), wherein the base part (14) contains a pulse width modulator (48), the provision of a pulse-width modulated signal (56) is provided by the pulse width modulator (48), a cyclic operation of the energy signal generator (42) is provided with the pulse width-modulated signal (56) such that an emission of the energy signal (22) is provided in pulse bundles (60), and a parameter specification (50) is provided which provides a control signal (54) which sets at least one parameter (PD, PB, PRT, V, TV) of the pulse width-modulated signal (56), wherein the at least one parameter (PD, PB, PRT, V, TV) is set to a value at which a sufficient energy transfer occurs for the provision of the supply voltage (Ub) in the mobile part (12).

2. System for contactless energy and data transfer according to claim 1, wherein the value to which the parameter (PD, PB, PRT, V, TV) is set is predetermined in a fixed manner.

3. System for contactless energy and data transfer according to claim 1, wherein the base part transceiver (44) determines a detection signal (52) in the case of a non-received data signal (18) and the parameter specification (50) is provided, and wherein the parameter determination (50) sets the at least one parameter (PD, PB, V, TV, PRT) of the pulse width-modulated signal (56) depending on an occurrence of the detection signal (52) in such a way that the energy of the emitted energy signal (22) is set to a minimum value at which the detection signal (52) is still present.

4. System for contactless energy and data transfer according to claim 1, wherein the ratio (V) of pulse duration (PD) to pulse break (PB) is provided as a parameter of the pulse width-modulated signal (56) and wherein the ratio (V) of pulse duration (PD) to pulse break (PB) is set to a minimum value at which a sufficient energy occurs for the provision of the supply voltage (Ub) in the mobile part (12).

5. System for contactless energy and data transfer according to claim 1, wherein the pulse duration (PD) is provided as a parameter of the pulse width-modulated signal (56), wherein the pulse duration (PD) is predetermined in a variable manner and the pulse break (PB) is predetermined in a fixed manner, and wherein the pulse duration (PD) is set to a minimum value at which a sufficient energy occurs for the provision of the supply voltage (Ub) in the mobile part (12).

6. System for contactless energy and data transfer according to claim 1, wherein the pulse break (PB) is provided as a parameter of the pulse width-modulated signal (56), wherein the pulse break (PB) is predetermined in a variable manner and the pulse duration (PD) is predetermined in a fixed manner, and wherein the pulse break (PB) is set to a maximum value at which a sufficient energy occurs for the provision of the supply voltage (Ub) in the mobile part (12).

7. System for contactless energy and data transfer according to claim 1, wherein the duty cycle (TV) is provided as a parameter of the pulse width-modulated signal (56), and wherein the duty cycle (TV) is set to a minimum value at which a sufficient energy occurs for the provision of the supply voltage (Ub) in the mobile part (12).

8. System for contactless energy and data transfer according to claim 1, wherein the period duration (PRT) of the pulse width-modulated signal (56) is provided as a parameter of the pulse width-modulated signal (56), and wherein the period duration (PRT) is set to a maximum value at which a sufficient energy occurs for the provision of the supply voltage (Ub) in the mobile part (12).

9. System for contactless energy and data transfer according to claim 1, wherein a mobile part resonant circuit (Lm, Cm) and a buffer capacitor (Cp) are provided in the current supply (36) of the mobile part (12).

10. System for contactless energy and data transfer according to claim 1, wherein the mobile part transmitter/receiver device (30) and the base part transmitter/receiver device (40) are each able to be implemented as optoelectronic transmitter/receiver devices.

11. System for contactless energy and data transfer according to claim 1, wherein the mobile part transmitter/receiver device (30) and the base part transmitter/receiver device (40) are each implemented as a coil.

* * * * *